United States Patent
El-Shaarawi et al.

(10) Patent No.: US 9,835,361 B2
(45) Date of Patent: Dec. 5, 2017

(54) SOLAR-POWERED LIBR-WATER ABSORPTION AIR CONDITIONING SYSTEM USING HYBRID STORAGE

(71) Applicant: KING FAHD UNIVERSITY OF PETROLEUM AND MINERALS, Dhahran (SA)

(72) Inventors: Maged A. I. El-Shaarawi, Giza (EG); Ali Abdulaziz Al-Ugla, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 123 days.

(21) Appl. No.: 14/936,483

(22) Filed: Nov. 9, 2015

(65) Prior Publication Data
US 2017/0130998 A1 May 11, 2017

(51) Int. Cl.
| | | |
|---|---|---|
| F25B 15/16 | (2006.01) | |
| F25B 15/06 | (2006.01) | |
| F25B 27/00 | (2006.01) | |
| F25B 41/04 | (2006.01) | |

(52) U.S. Cl.
CPC ............ F25B 15/06 (2013.01); F25B 27/007 (2013.01); *F25B 41/04* (2013.01); *F25B 2400/0415* (2013.01); *F25B 2400/16* (2013.01); *F25B 2400/24* (2013.01)

(58) Field of Classification Search
CPC ........... F25B 15/10; F25B 27/02; Y02B 10/20
USPC ............. 62/109, 235.1, 235.3, 271; 237/2 B; 165/48.2, 62
See application file for complete search history.

(56) References Cited

U.S. PATENT DOCUMENTS

| | | | | |
|---|---|---|---|---|
| 4,011,731 A | * | 3/1977 | Meckler | F24F 3/1405 126/609 |
| 4,205,529 A | * | 6/1980 | Ko | F24F 3/1417 62/235.1 |
| 4,222,244 A | * | 9/1980 | Meckler | B01D 53/26 62/235.1 |
| 4,429,545 A | * | 2/1984 | Steinberg | F24J 2/265 126/661 |
| 8,720,216 B1 | | 5/2014 | Said | |
| 9,488,394 B1 | * | 11/2016 | El-Shaarawi | F25B 27/007 |
| 2012/0304682 A1 | | 12/2012 | Kontomaris | |

(Continued)

*Primary Examiner* — Melvin Jones
(74) *Attorney, Agent, or Firm* — Oblon, McClelland, Maier & Neustadt, L.L.P.

(57) ABSTRACT

The solar-powered LiBr-water absorption air conditioning system using hybrid storage includes one or more solar collectors generating heat energy to drive the system. The solar collector communicates with a generator to heat an aqueous LiBr solution and release refrigerant through vaporization. The refrigerant feeds into a condenser to form a refrigerant condensate. The condensate feeds into an evaporator, which throttles the refrigerant and causes flash vaporization, resulting in cooling discharged into a load. The refrigerant from the evaporator feeds into an absorber containing a weak LiBr-water mixture from the generator to facilitate absorption of the refrigerant. A pump feeds the resultant aqueous LiBr solution back to the generator for another cycle. The hybrid storage includes a combination of heat storage tank, refrigerant storage tank, and/or a cold water tank coupled to the generator, condenser, and the evaporator to supplement driving or additional cooling during nighttime for continuous daily operation.

20 Claims, 4 Drawing Sheets

(56) References Cited

U.S. PATENT DOCUMENTS

2012/0324925 A1 12/2012 Radhakrishnan et al.
2014/0196481 A1 7/2014 Dube

* cited by examiner

SOLAR-POWERED LIBR-WATER ABSORPTION AIR CONDITIONING SYSTEM USING HYBRID STORAGE

BACKGROUND OF THE INVENTION

1. Field of the Invention

The present invention relates to air conditioning systems, and particularly to a solar-powered LiBr-water absorption, air-cooled, air conditioning system, which is a single-effect vapor absorption refrigeration system that includes hybrid storage to provide continuous 24-hour per day operation, without any interruption during the storage-maintenance process.

2. Description of the Related Art

Most conventional absorption cycle systems are categorized into single- and multi-circuit (or multi-effect) systems. In a typical absorption cycle system, a refrigerant, such as water vapor, is absorbed into an absorbent mixture, such as an aqueous LiBr (lithium bromide) solution, and released out of the absorbent mixture, creating a cooling effect. A heat source, such as solar energy, fossil fuel flame, waste heat from factories, and the like, provides the energy needed to drive the cooling process. A single-circuit system usually includes a generator, condenser, evaporator, and an absorber to process the refrigerant and absorbent mixture through the absorption cycle, whereas a multi-circuit system includes the necessary components to facilitate independent, multiple streams of refrigerants and absorbents.

While these absorption cycle systems provide cooling more efficiently and with less operating cost compared to electric vapor compression systems, solar-powered absorption systems present unique challenges. Due to the heat source, solar-powered systems typically cannot operate continuously in a 24-hour daily period. Solar exposure and insolation is only available during daylight hours, and nighttime operation must resort to other sources of heat energy, such as the fossil fuel flame mentioned above. This situation is also exacerbated when maintenance is required on a failed or worn component of the system which can lead to interrupted operation and/or extended downtime. There is a need for some means to compensate for the lack of solar exposure and insolation during nighttime hours for continuous operation. Thus, a solar-powered LiBr-water absorption air conditioning system using hybrid storage solving the aforementioned problems is desired.

SUMMARY OF THE INVENTION

The solar-powered LiBr-water absorption air conditioning system using hybrid storage includes one or more sets of solar collectors generating heat energy to drive the system. The solar collector communicates with a generator to heat an aqueous LiBr solution and release refrigerant through vaporization. The refrigerant feeds into a condenser to form a refrigerant condensate. The refrigerant condensate feeds into an evaporator, which throttles the refrigerant and causes flash vaporization, resulting in a cooling effect discharged into a load. The refrigerant from the evaporator feeds into an absorber containing a weak LiBr-water mixture to facilitate absorption of the refrigerant. A pump feeds the resultant aqueous LiBr solution back to the generator for another cycle. The hybrid storage includes a combination of heat storage tank, refrigerant storage tank, and/or a cold water tank coupled to the generator, condenser, and the evaporator to supplement driving or additional cooling during nighttime for continuous daily operation.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
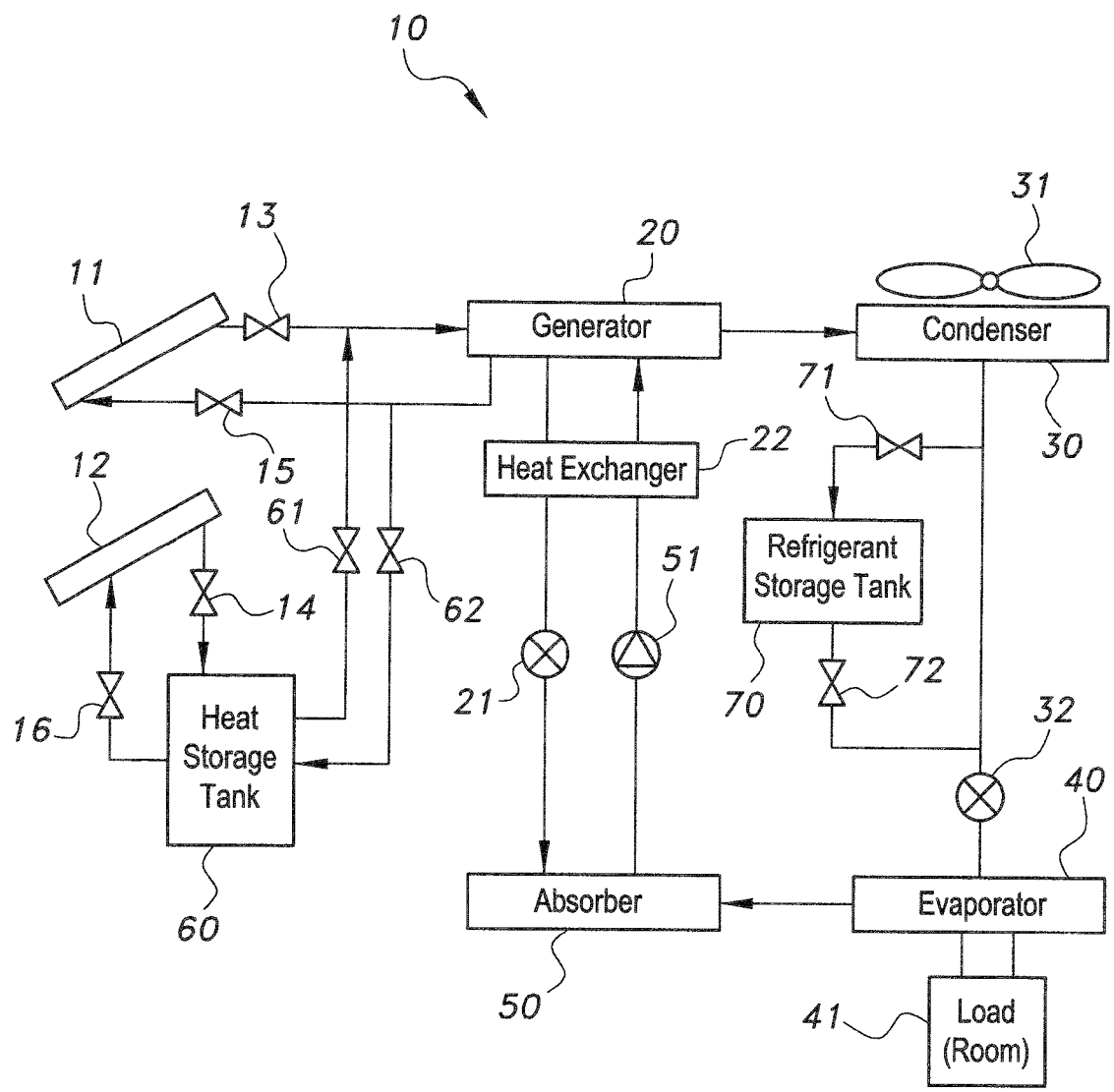
FIG. 1 is a schematic diagram of a first embodiment of a solar-powered LiBr-water absorption air conditioning system using hybrid storage according to the present invention.

The solar-powered LiBr-water absorption air conditioning system using hybrid (heat and refrigerant) storage, a first embodiment of which is generally referred to by the reference number 10 in FIG. 1, provides an efficient configuration for continuous 24-hour daily operation, i.e., day and night, by utilizing a variety of hybrid heat and refrigerant storage systems or assemblies. The heat storage will store heat during daytime when the solar energy is sufficient and utilize the stored heat at both the nighttime when the solar energy is not available and when the solar insolation is insufficient to produce the required generator temperature for operation of the system.

As best seen in FIG. 1, the solar-powered LiBr-water absorption air conditioning system 10 may include two sets of solar collectors, such as a pair of collectors including a first solar collector 11 and a second solar collector 12. Depending on operational requirements, each first solar collector 11 and second solar collector 12 may be provided as respective sets or single units. A first collector outflow valve 13 and a first collector inflow valve 15 are coupled to the first solar collector 11. The first collector outflow valve 13 enables selective flow of heated medium from the first solar collector 11 to a generator 20, and the first collector inflow valve 15 enables selective flow of heat-depleted medium back to the first solar collector 11 to reheat the medium and recirculate the same during daytime operation. The medium can also be referred to as a heat transfer medium.

The generator 20 heats an aqueous LiBr solution, the solution being a mixture of water and LiBr in which the water acts as a refrigerant, while the LiBr acts as an absorbent, Heating of this solution releases the refrigerant (water) through evaporation, creating a weak absorbent-refrigerant solution. The evaporated refrigerant travels to a condenser 30, while the absorbent-refrigerant solution, now weak in refrigerant, passes on to an absorber 50.

A first expansion valve 21 is coupled between the generator 20 and the absorber 50 to regulate flow of the weak-in-refrigerant absorbent-refrigerant solution from the generator 20 to the absorber 50. A heat exchanger 22 can be provided between the generator 20 and the absorber 50 to increase efficiency of the medium flowing therebetween by pre-cooling the weak-in-refrigerant absorbent-refrigerant solution prior to reaching the absorber 50 and pre-heating the medium flowing into the generator 20 from the absorber 50.

The condenser 30 undergoes a heat exchange or cooling process, as exemplified by a fan 31, to change the vapor refrigerant into liquid refrigerant or refrigerant condensate. The liquid refrigerant flows from the condenser 30 to an evaporator 40 where the refrigerant undergoes a throttling process. The throttling process reduces pressure of the liquid refrigerant to an extent that causes the refrigerant to flash into a liquid-vapor mixture and create a cooling effect in the evaporator 40. This cooling, or cooled air from the cooling, feeds out into a load 41, such as a room or container. A second expansion valve 32 is provided in the line between the condenser 30 and the evaporator 40 to regulate flow of refrigerant into the evaporator 40. The heat rejection to the ambient can be facilitated by natural convection or forced by a fan.

The refrigerant from the evaporator 40 feeds into the absorber 50 to enable absorption of the refrigerant into the weak-in-refrigerant absorbent-refrigerant solution contained in the absorber 50. Since the weak-in-refrigerant absorbent-refrigerant solution is absorbent-rich, i.e., it has a higher concentration of LiBr, the absorbent-rich solution readily absorbs the refrigerant, resulting in the aqueous LiBr solution mentioned above, now relatively strong in refrigerant. The absorber 50 includes a pump 51 to feed the aqueous LiBr solution to the generator 20.

To facilitate daytime and nighttime continuous operation, the solar-powered LiBr-water absorption air conditioning system 10 includes a hybrid storage system or assembly that assists in supplying heat and refrigerant during nighttime operation. As shown in FIG. 1, the hybrid (heat and refrigerant) storage system includes a heat storage tank 60 coupled to the second solar collector 12 and a refrigerant storage tank 70 operatively coupled to a flow line between the condenser 30 and the evaporator 40. The media being stored in the heat storage tank 60 and the refrigerant storage tank 70 can also be referred to as thermal media. Thus, the hybrid storage is a combination of heat storage and refrigerant storage.

A second collector outflow valve 14 and a second collector inflow valve 16 are coupled to the second solar collector 12. The second collector outflow valve 14 enables selective flow of heated medium from the second solar collector 12 to the heat storage tank 60, and the second collector inflow valve 16 enables selective flow of medium within the heat storage tank 60 back to the second solar collector 12 to reheat and recirculate the medium during daytime operation.

The heat storage tank 60 includes a generator supply valve 61 and a generator outlet valve 62. The generator supply valve 61 enables selective flow of heated medium from the heat storage tank 60 into the generator 20, while the generator outlet valve enables selective outflow of heat-depleted medium from the generator 20 back into the heat storage tank 60. The generator supply valve 61 and the generator outflow valve 62 are closed during the day and open during the night.

The refrigerant storage tank 70 includes a refrigerant supply valve 71 coupled to a flow line from the condenser 30 and a refrigerant outflow valve 72 coupled to the same flow line leading into the evaporator 40. Since the heat storage tank 60 and the refrigerant storage tank 70 process and store thermal media, both tanks 60, 70 are preferably insulated. The refrigerant tank 70 may be provided with relatively thinner insulation. The refrigerant supply valve 71 is open during daytime and closed during nighttime to accumulate and store some excess refrigerant during the daytime. While the refrigerant supply valve 71 is open, the refrigerant outflow valve 72 is closed during daytime and vice versa during nighttime.

In operation, the first collector outflow valve 13, first collector inflow valve 15, second collector outflow valve 14, second collector inflow valve 16, and the refrigerant supply valve 71 are open during daytime or daylight hours when solar exposure and energy can be harnessed. The generator supply valve 61 and the generator outflow valve 62 are also closed during daytime operation. This allows the heated medium to release the refrigerant in the generator 20 and condense the refrigerant in the condenser 30. The condenser 30 feeds liquid refrigerant through a throttling valve and then to the evaporator 40 to generate cooling, and the refrigerant flows into the absorber 50 to form the required aqueous LiBr solution to repeat the cycle. Some of the refrigerant condensate from the condenser 30 flows into the refrigerant storage tank 70 for nighttime operation.

While the heat transfer medium is being heated in the first solar collector 11, the second solar collector 12 is also heating a medium or heat transfer medium stored in the heat storage tank 60. Since solar power is not available during nighttime, the heat energy required for nighttime operation is supplied by the heated medium in the heat storage tank 60. During nighttime operation, the first collector outflow valve 13, first collector inflow valve 15, second collector outflow valve 14, second collector inflow valve 16, and the refrigerant supply valve 71 are closed, while the generator supply valve 61 and the generator outflow valve 62 are open to enable heat transfer medium flow between the generator 20 and the heat storage tank 60 and drive the cooling process. The refrigerant outflow valve 72 is also open during nighttime operation, while the refrigerant supply valve 71 is closed. The refrigerant storage tank 70 supplies refrigerant accumulated therein during daytime operation to the evaporator 40 via the refrigerant outflow valve 72. This supplements the refrigerant condensate being fed into the evaporator 40 from the condenser 30 during nighttime operation. Thus, it can be seen from the above that the hybrid storage system of a heat storage tank 60 and a refrigerant storage tank 70 enables continuous operation of the solar-powered LiBr-water absorption air conditioning system 10 during nighttime hours without interruption during any maintenance process. The coefficient of performance (COP) of this system is comparatively higher during nighttime operation.

Figure 2:
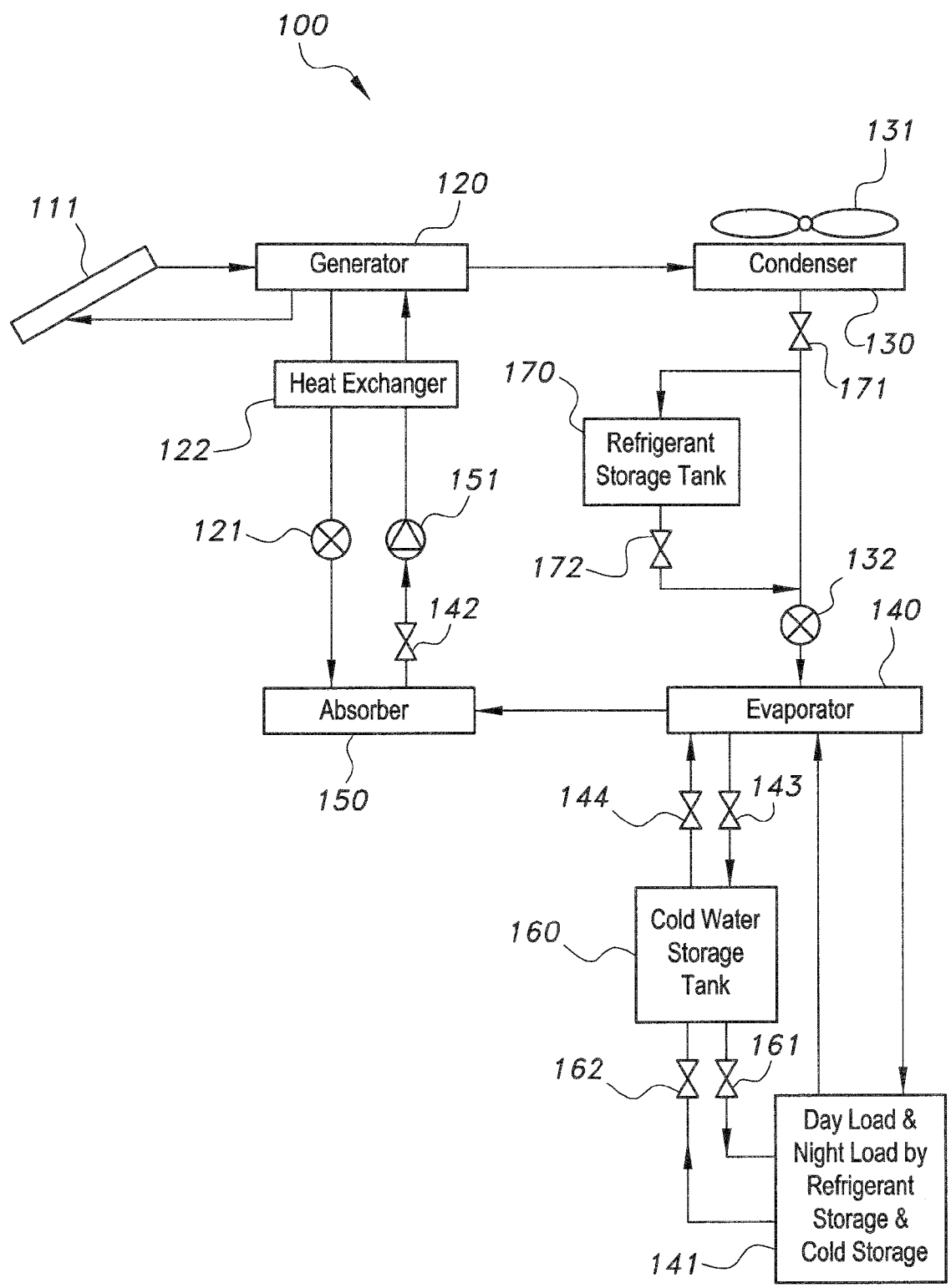
FIG. 2 is a schematic diagram of a second embodiment of a solar-powered LiBr-water absorption air conditioning system using hybrid storage according to the present invention.

A second embodiment of a solar-powered LiBr-water absorption air conditioning system 100 is diagrammatically shown in FIG. 2. In this embodiment, the hybrid (cold and refrigerant) storage system includes a cold water storage tank 160 instead of the heat storage tank 60.

The solar-powered LiBr-water absorption air conditioning system 100 includes a solar collector set, such as a first solar collector 111. The first collector 111 is coupled directly to a generator 120 to circulate heat transfer medium therein.

The generator 120 heats an aqueous LiBr solution, causing an increase in partial pressure without changing the total pressure. In this instance, the solution is a mixture of water and LiBr in which the water acts as a refrigerant, while the LiBr acts as an absorbent. Heating of this solution releases the refrigerant (water) through evaporation, resulting in an absorbent-refrigerant solution that is now weak in refrigerant. The evaporated refrigerant travels to a condenser 130, while the weak absorbent-refrigerant solution passes on to an absorber 150.

A first expansion valve 121 is coupled between the generator 120 and the absorber 150 to regulate flow of the weak-in-refrigerant absorbent-refrigerant solution from the generator 120 to the absorber 150. A heat exchanger 122 can be provided between the generator 120 and the absorber 150 to increase efficiency of the medium flowing therebetween by pre-cooling the weak-in-refrigerant absorbent-refrigerant solution prior to reaching the absorber 150 and pre-heating the medium flowing into the generator 120 from the absorber 150.

The condenser 130 undergoes a heat exchange or cooling process, as exemplified by a fan 131, to change the vapor refrigerant into liquid refrigerant. The liquid refrigerant flows from the condenser 130 to an evaporator 140, where the refrigerant undergoes a throttling process. The throttling process reduces pressure of the liquid refrigerant to an extent that causes the refrigerant to flash into a liquid-vapor mixture and create a cooling effect in the evaporator 140. This cooling, or cooled air from the cooling, feeds out into a load 141, such as a room or container. A second expansion valve 132 is provided in the line between the condenser 130 and the evaporator 140 to regulate flow of refrigerant into the evaporator 140. The heat rejection to the ambient air can be facilitated by natural convection or forced by a fan.

The refrigerant from the evaporator 140 feeds into the absorber 150 to enable absorption of the refrigerant into the weak-in-refrigerant absorbent-refrigerant solution contained in the absorber 150. Valve 142 is disposed between the absorber 150 and pump 151 to regulate the flow of strong-in-refrigerant solution from the absorber 150. Since the weak-in-refrigerant solution is absorbent-rich, i.e., it has a higher concentration of LiBr, the weak-in-refrigerant solution (or absorbent-rich solution) readily absorbs the refrigerant from the evaporator 140, resulting in the aqueous LiBr solution mentioned above, i.e., the absorbent-refrigerant solution in the absorber 150 becomes strong in refrigerant upon absorbing refrigerant from the evaporator 140. The absorber 150 includes a pump 151 to feed the aqueous LiBr solution, now strong in refrigerant, to the generator 120.

To facilitate daytime and nighttime continuous operation, the solar-powered LiBr-water absorption air conditioning system 100 includes a hybrid storage system that assists in cooling during nighttime. Moreover, the hybrid storage system ensures continuous, uninterrupted operation should a tank fail. As shown in FIG. 2, the hybrid storage system includes a refrigerant storage tank 170 operatively coupled to a flow line between the condenser 130 and the evaporator 140 and a cold water storage tank 160 coupled to the evaporator 140. The media being stored in the refrigerant storage tank 170 and the cold water storage tank 160 can also be referred to as thermal media.

The refrigerant storage tank 170 includes a refrigerant supply valve 171 coupled to the flow line from the condenser 130 and a refrigerant outflow valve 172 coupled to the same flow line leading into the evaporator 140. The refrigerant supply valve 171 is open during daytime and closed during nighttime to accumulate and store some excess refrigerant during the daytime. While the refrigerant supply valve 171 is open, the refrigerant outflow valve 172 is closed during daytime and vice versa during nighttime.

The evaporator 140 also includes an auxiliary refrigerant outflow valve 143 and an auxiliary refrigerant inflow valve 144 connected to separate lines feeding into and out of the cold water storage tank 160, respectively. The cold water storage tank 160 stores cold water, and the auxiliary refrigerant outflow valve 143 and the auxiliary refrigerant inflow valve 144 enables circulation of the refrigerant from the evaporator 140 to cool and maintain the water in the cold water storage tank 160 at a desired or predetermined cold temperature, preferably a temperature that can facilitate cooling of the load 141. These auxiliary valves 143, 144 are open during daytime and closed during nighttime. The cold water storage tank 160 is also provided with a cold water outflow valve 161 and a cold water inflow valve 162 coupled to separate lines extending between the cold water storage tank 160 and the load 141. The cold water valves 161, 162 are preferably open during nighttime and during periods of insufficient solar insolation, and closed during daytime.

In operation, the refrigerant supply valve 171, the refrigerant valve 142, the auxiliary refrigerant outflow valve 143, and the auxiliary refrigerant inflow valve 144 are open during daytime or daylight hours when solar exposure and energy can be harnessed, while the water outflow valve 161 and the cold water inflow valve 162 remain closed. This allows the heated medium to release the refrigerant in the generator 120 and condense the refrigerant in the condenser 130. The condenser 130 feeds liquid refrigerant to the evaporator 140 to generate cooling, and the refrigerant flows into the absorber 150 to form the required aqueous LiBr solution to repeat the cycle. Some of the refrigerant from the evaporator 140 also circulates through the cold water storage tank 170 to cool and maintain the water therein at the desired temperature.

Since solar power is not available during nighttime, all the open valves 142, 143, 144, 171 from daytime operation are closed, and the cold water outflow valve 161, the cold water inflow valve 162, and the refrigerant outflow valve 172 are open for nighttime operation. This configuration allows stored refrigerant from the refrigerant storage tank 170 to flow into the evaporator 140 and facilitate part of the required nighttime load. The remainder of the nighttime load is accommodated by heat rejection from circulating cold water. This can be facilitated by natural convection or by forced fan providing airflow over cold water lines. In this embodiment, the generator 120, the condenser 130, the absorber 150, and related components operate at daytime only. Moreover, the control requirements for the solar-powered LiBr-water absorption air conditioning system 100 are less complex due to the reduced number of valve closing and opening operations during the daytime.

Figure 3:
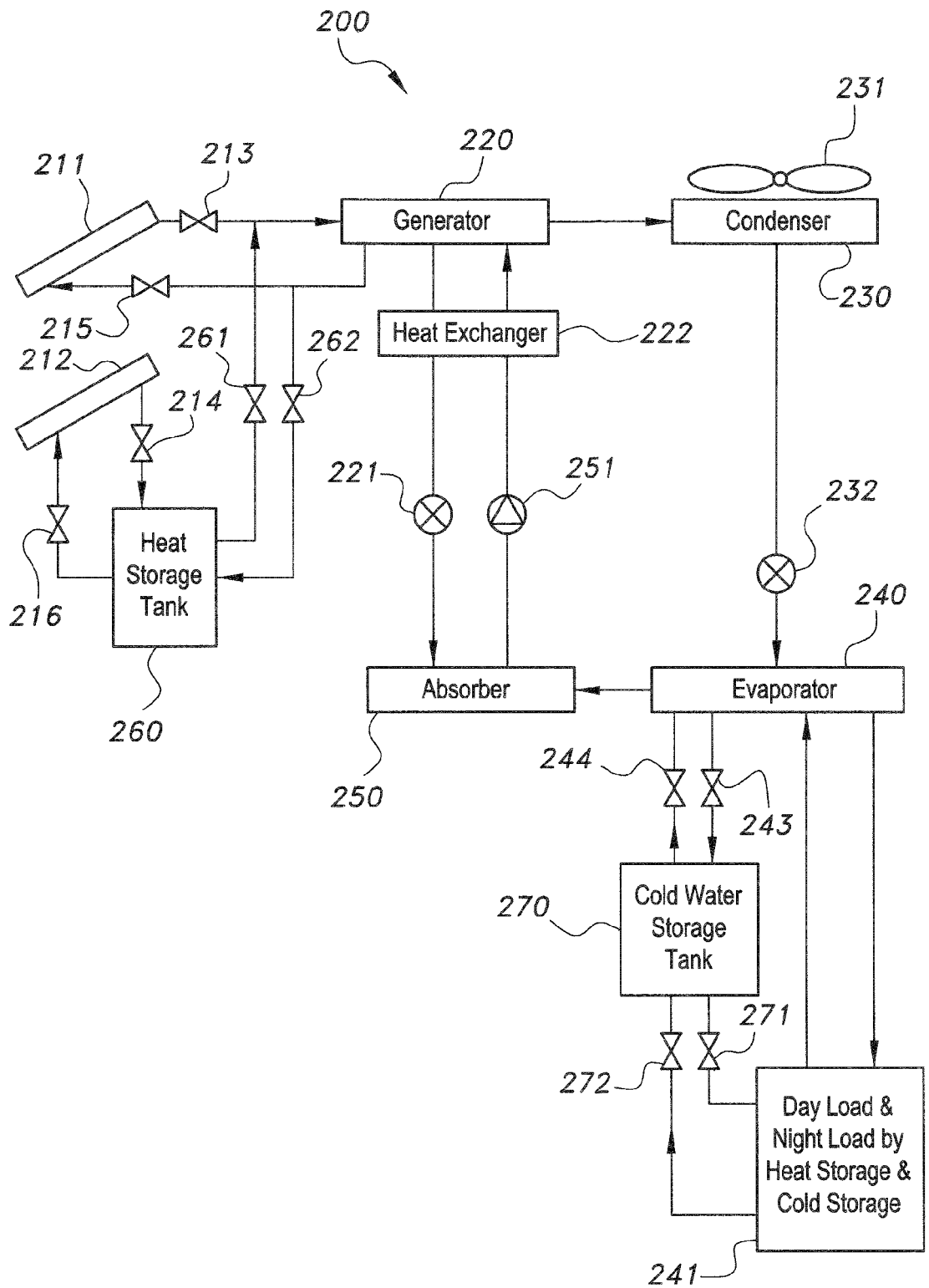
FIG. 3 is a schematic diagram of a third embodiment of a solar-powered LiBr-water absorption air conditioning system using hybrid storage according to the present invention.

A third embodiment of a solar-powered LiBr-water absorption air conditioning system 200 is diagrammatically shown in FIG. 3. In this embodiment, the hybrid storage system includes a cold water storage tank 270 instead of a refrigerant storage tank 70.

The solar-powered LiBr-water absorption air conditioning system 200 may include two sets of solar collectors, such as a pair of collectors including a first solar collector 211 and a second solar collector 212. A first collector outflow valve 213 and a first collector inflow valve 215 are coupled to the first solar collector 211. The first collector outflow valve 213 enables selective flow of heated medium from the first solar collector 211 to a generator 220, and the first collector inflow valve 215 enables selective flow of heat-depleted medium back to the first solar collector 211 to reheat the medium and recirculate the same. The medium can also be referred to as a heat transfer medium.

The generator 220 heats an aqueous LiBr solution, the solution being a mixture of water and LiBr in which the water acts as a refrigerant, while the LiBr acts as an absorbent. Heating of this solution releases the refrigerant (water) to evaporate, so that the absorbent-refrigerant solution is now weak in refrigerant. The evaporated refrigerant travels to a condenser 230, while the weak-in-refrigerant absorbent-refrigerant solution passes on to an absorber 250.

A first expansion valve 221 is coupled between the generator 220 and the absorber 250 to regulate the flow of the weak-in-refrigerant absorbent-refrigerant solution from the generator 220 to the absorber 250. A heat exchanger 222 can be provided between the generator 220 and the absorber 250 to increase efficiency of the medium flowing therebetween by pre-cooling the weak absorbent-refrigerant solution prior to reaching the absorber 250 and pre-heating the medium flowing into the generator 220 from the absorber 250.

The condenser 230 undergoes a heat exchange or cooling process, as exemplified by a fan 231, to change the vapor refrigerant into liquid refrigerant or refrigerant condensate. The liquid refrigerant flows from the condenser 230 to an evaporator 240, where the refrigerant undergoes a throttling process. The throttling process reduces pressure of the liquid refrigerant to an extent that causes the refrigerant to flash into vapor and create a cooling effect. This cooling, or cooled air from the cooling, feeds out into a load 241, such as a room or container. A second expansion valve 232 is provided in the line between the condenser 230 and the evaporator 240 to regulate flow of refrigerant into the evaporator 240. The heat rejection to the ambient air can be facilitated by natural convection or forced by a fan.

The refrigerant from the evaporator 240 feeds into the absorber 250 to enable absorption of the refrigerant into the weak-in-refrigerant absorbent-refrigerant solution contained in the absorber 250. Since the weak-in-refrigerant solution is absorbent-rich, i.e., it has a higher concentration of LiBr, the absorbent-rich solution readily absorbs the refrigerant, resulting in the aqueous LiBr solution mentioned above, the absorbent-refrigerant solution now being strong in refrigerant after absorption of refrigerant from the evaporator 240. The absorber 250 includes a pump 251 to feed the aqueous LiBr solution (now strong in refrigerant) to the generator 220.

To facilitate daytime and nighttime continuous operation, the solar-powered LiBr-water absorption air conditioning system 200 includes a hybrid storage system that assists in supplying heat and cooling during nighttime without any interruption in operation if one storage tank is taken away for repair. As shown in FIG. 3, the hybrid storage system includes a heat storage tank 260 coupled to the second solar collector 212 and the cold water storage tank 270 operatively coupled to the evaporator 240. The media being stored in the heat storage tank 260 and the cold water storage tank 270 can also be referred to as thermal media.

A second collector outflow valve 214 and a second collector inflow valve 216 are coupled to the second solar collector 212. The second collector outflow, valve 214 enables selective flow of heated medium from the second solar collector 212 to the heat storage tank 260, and the second collector inflow valve 216 enables selective flow of medium within the heat storage tank 260 back to the second solar collector 212 to reheat the medium and recirculate the same.

The heat storage tank 260 includes a generator supply valve 261 and a generator outlet valve 262. The generator supply valve 261 enables selective flow of heated medium from the heat storage tank 260 into the generator 220, while the generator outlet valve enables selective outflow of heat-depleted medium from the generator 220 back into the heat storage tank 260. The generator supply valve 261 and the generator outflow valve 262 are closed during the day and open during the night.

The evaporator 240 includes an auxiliary refrigerant outflow valve 243 and an auxiliary refrigerant inflow valve 244 connected to separate lines feeding into and out of the cold water storage tank 270, respectively. The cold water storage tank 270 stores cold water, and the auxiliary refrigerant outflow valve 243 and the auxiliary refrigerant inflow valve 244 enable circulation of the refrigerant from the evaporator 240 to cool and maintain the water in the cold water storage tank 270 at a desired or predetermined cold temperature, preferably a temperature that can facilitate cooling of the load 241. These auxiliary valves 243, 244 are open during daytime and closed during nighttime. The cold water storage tank 270 is also provided with a cold water outflow valve 271 and a cold water inflow valve 272 coupled to separate lines extending between the cold water storage tank 260 and the load 241. The cold water valves 271, 272 are preferably open during nighttime and closed during daytime.

In operation, the first collector outflow valve 213, first collector inflow valve 215, second collector outflow valve 214, second collector inflow valve 216, auxiliary refrigerant outflow valve 243, and auxiliary refrigerant inflow valve 244 are open during daytime or daylight hours when solar exposure and energy can be harnessed. The generator supply valve 261 and the generator outflow valve 262 are closed during daytime operation. This allows the heated medium to release the refrigerant in the generator 220 and condense the refrigerant in the condenser 230 during nighttime operation. The condenser 230 feeds liquid refrigerant to the evaporator 240 to generate cooling, and the refrigerant flows into the absorber 250 to form the required aqueous LiBr solution to repeat the cycle. Some of the refrigerant from the evaporator 240 also circulates through the cold water storage tank 270 to cool and maintain the water therein at the desired temperature.

While the heat transfer medium is being heated in the first solar collector 211, the second solar collector 212 is also heating a medium or heat transfer medium stored in the heat storage tank 260. Since solar power is not available during nighttime, the heat energy required for nighttime operation is supplied by the heated medium in the heat storage tank 260. During nighttime operation, the first collector outflow valve 213, first collector inflow valve 215, second collector outflow valve 214, second collector inflow valve 216, auxiliary refrigerant outflow valve 243, and auxiliary refrigerant inflow valve 244 are closed, while the generator supply valve 261 and the generator outflow valve 262 are open to enable heat transfer medium flow between the generator 220 and the heat storage tank 260 and drive the cooling process. The cold water outflow valve 271 and the cold water inflow valve 272 are open for nighttime operation. The stored heat energy from the heat storage tank 270 meets some of the nighttime load, while the remainder of the nighttime load is accommodated by heat rejection from circulating cold water. This can be facilitated by natural convection or forced by a fan providing airflow over cold water lines. As with the previous embodiments, the hybrid storage system enables continuous, uninterrupted operation should one of the storage tanks is down form maintenance or repair.

Figure 4:
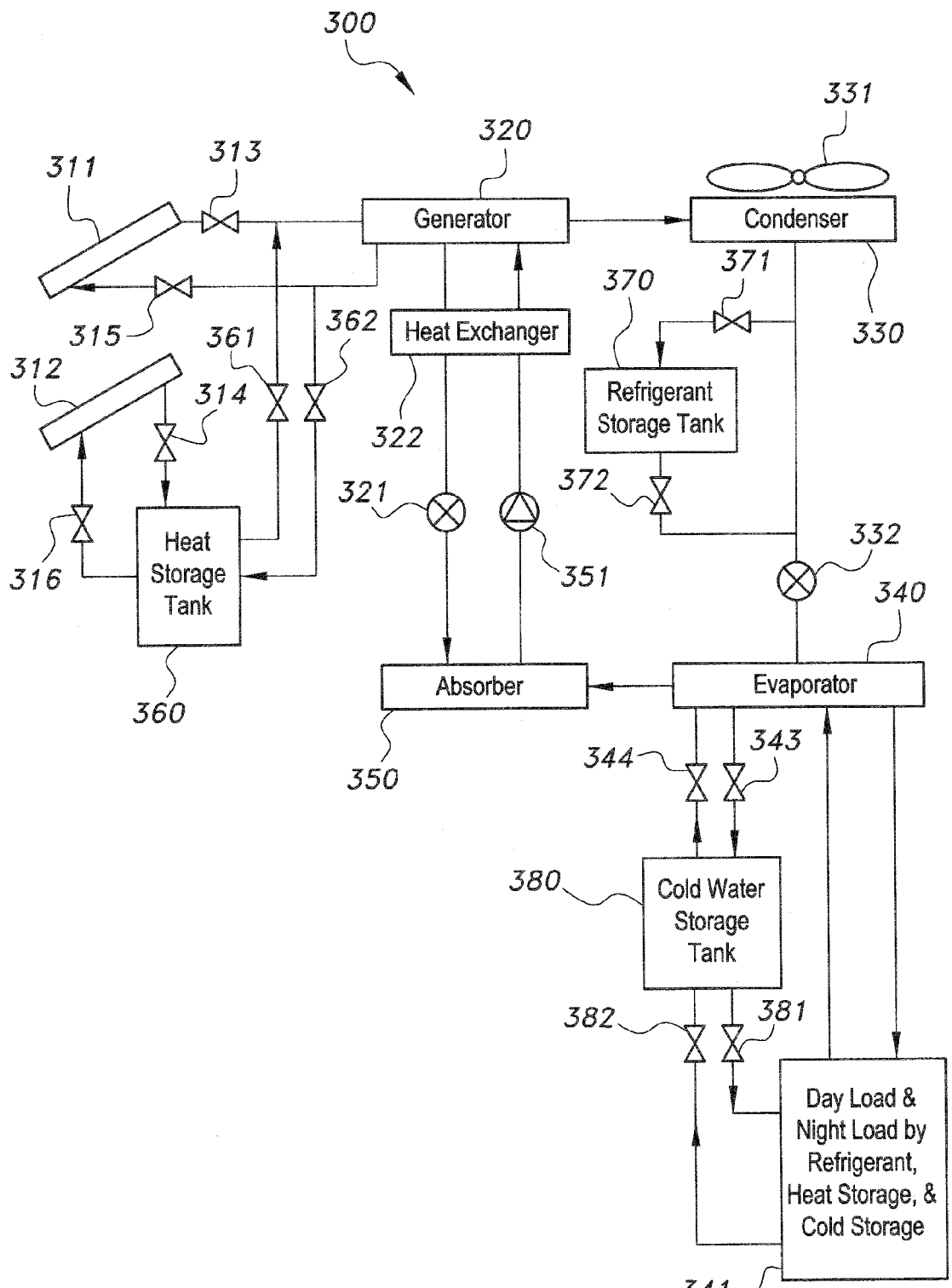
FIG. 4 is a schematic diagram of a fourth embodiment of a solar-powered LiBr-water absorption air conditioning system using hybrid storage according to the present invention.

A fourth embodiment of a solar-powered LiBr-water absorption air conditioning system 300 is diagrammatically shown in FIG. 4. In this embodiment, the hybrid (heat, refrigerant, and cold) storage system includes a heat storage tank 360, a refrigerant storage tank 370, and a cold water storage tank 380.

The solar-powered LiBr-water absorption air conditioning system 300 may include two sets of solar collectors, such as a pair of collectors including a first solar collector 311 and a second solar collector 312. A first collector outflow valve 313 and a first collector inflow valve 315 are coupled to the first solar collector 311. The first collector outflow valve 313 enables selective flow of heated medium from the first solar collector 311 to a generator 320, and the first collector inflow valve 315 enables selective flow of heat-depleted medium back to the first solar collector 311 to reheat the medium and recirculate the same. The medium can also be referred to as a heat transfer medium.

The generator 320 heats an aqueous LiBr solution, causing an increase in partial pressure without changing the total pressure. In this instance, the solution is a mixture of water and LiBr in which the water acts as a refrigerant, while the LiBr acts as an absorbent. Heating of this solution releases the refrigerant (water) to evaporate, so that the absorbent-refrigerant solution is now weak in refrigerant. The evaporated refrigerant travels to a condenser 330, while the absorbent-refrigerant solution, now weak in refrigerant, passes on to an absorber 350.

A first expansion valve 321 is coupled between the generator 320 and the absorber 350 to regulate flow of the weak-in-refrigerant absorbent-refrigerant solution from the generator 320 to the absorber 350. A heat exchanger 322 can be provided between the generator 320 and the absorber 350 to increase efficiency of the medium flowing therebetween by pre-cooling the weak-in-refrigerant absorbent-refrigerant solution prior to reaching the absorber 350 and pre-heating the medium flowing into the generator 320 from the absorber 350.

The condenser 330 undergoes a heat exchange or cooling process, as exemplified by a fan 331, to change the vapor refrigerant into liquid refrigerant or refrigerant condensate. The liquid refrigerant flows from the condenser 330 to an evaporator 340, where the refrigerant undergoes a throttling process. The throttling process reduces pressure of the liquid refrigerant to an extent that causes the refrigerant to flash into vapor and create a cooling effect. This cooling, or cooled air from the cooling, feeds out into a load 341, such as a room or container. A second expansion valve 332 is provided in the line between the condenser 330 and the evaporator 340 to regulate flow of refrigerant into the evaporator 340. The heat rejection to the ambient air can be facilitated by natural convection or forced by a fan.

The refrigerant from the evaporator 340 feeds into the absorber 350 to enable absorption of the refrigerant into the weak-in-refrigerant absorbent-refrigerant solution contained in the absorber 350. Since the weak-in-refrigerant absorbent-refrigerant solution is absorbent-rich, i.e., it has a higher concentration of LiBr, the absorbent-rich solution readily absorbs the refrigerant, resulting in the aqueous LiBr solution mentioned above, now strong in refrigerant. The absorber 350 includes a pump 351 to feed the aqueous LiBr solution (now strong in refrigerant) to the generator 320.

To facilitate daytime and nighttime continuous operation, the solar-powered LiBr-water absorption air conditioning system 300 includes a hybrid storage system that assists in supplying heat and cooling during nighttime without interruption in operation during maintenance procedures in daytime or nighttime. As shown in FIG. 4, the hybrid storage system includes a heat storage tank 360 coupled to the second solar collector 312, a refrigerant storage tank 370 operatively coupled to a flow line between the condenser 330 and the evaporator 340, and the cold water storage tank 380 operatively coupled to the evaporator 340. The media being stored in the heat storage tank 360, the refrigerant storage tank 370, and the cold water storage tank 380 can also be referred to as thermal media.

A second collector outflow valve 314 and a second collector inflow valve 316 are coupled to the second solar collector 312. The second collector outflow valve 314 enables selective flow of heated medium from the second solar collector 312 to the heat storage tank 360, and the second collector inflow valve 316 enables selective flow of medium within the heat storage tank 360 back to the second solar collector 312 to reheat the medium and recirculate the same.

The heat storage tank 360 includes a generator supply valve 361 and a generator outlet valve 362. The generator supply valve 361 enables selective flow of heated medium from the heat storage tank 360 into the generator 320 while the generator outlet valve enables selective outflow of heat-depleted medium from the generator 320 back into the heat storage tank 360. The generator supply valve 361 and the generator outflow valve 362 are closed during the day and open during the night.

The refrigerant storage tank 370 includes a refrigerant supply valve 371 coupled to a flow line from the condenser 330 and a refrigerant outflow valve 372 coupled to the same flow line leading into the evaporator 340. The refrigerant supply valve 371 is open during daytime and closed during nighttime to accumulate and store some excess refrigerant during the daytime. While the refrigerant supply valve 371 is open, the refrigerant outflow valve 372 is closed during daytime and vice versa during nighttime.

The evaporator 340 includes an auxiliary refrigerant outflow valve 343 and an auxiliary refrigerant inflow valve 344 connected to separate lines feeding into and out of the cold water storage tank 380, respectively. The cold water storage tank 380 stores cold water, and the auxiliary refrigerant outflow valve 343 and the auxiliary refrigerant inflow valve 344 enables circulation of the refrigerant from the evaporator 340 to cool and maintain the water in the cold water storage tank 380 at a desired or predetermined cold temperature, preferably a temperature that can facilitate cooling of the load 341. These auxiliary valves 343, 344 are open during daytime and closed during nighttime. The cold water storage tank 380 is also provided with a cold water outflow valve 381 and a cold water inflow valve 382 coupled to separate lines extending between the cold water storage tank 380 and the load 341. The cold water valves 381, 382 are preferably open during nighttime and closed during daytime.

In operation, the first collector outflow valve 313, first collector inflow valve 315, second collector outflow valve 314, second collector inflow valve 316, refrigerant supply valve 371, auxiliary refrigerant outflow valve 343, and auxiliary refrigerant inflow valve 344 are open during daytime or daylight hours when solar exposure and energy can be harnessed. The generator supply valve 361 and the generator outflow valve 362 are closed during daytime. This allows the heated medium to release the refrigerant in the generator 320 and condense the refrigerant in the condenser 330 during nighttime. The condenser 330 feeds liquid refrigerant to the evaporator 340 to generate cooling, and the refrigerant flows into the absorber 350 to form the required aqueous LiBr solution to repeat the cycle. Some of the refrigerant condensate from the condenser 330 flows into the refrigerant storage tank 370 for nighttime operation, and some of the refrigerant from the evaporator 340 also circulates through the cold water storage tank 380 to cool and maintain the water therein at the desired temperature.

While the heat transfer medium is being heated in the first solar collector 311, the second solar collector 312 is also heating a medium or heat transfer medium stored in the heat storage tank 360. Since solar power is not available during nighttime, the heat energy required for nighttime operation is supplied by the heated medium in the heat storage tank

360. During nighttime operation, the first collector outflow valve 313, first collector inflow valve 315, second collector outflow valve 314, second collector inflow valve 316, refrigerant supply valve 371, auxiliary refrigerant outflow valve 343, and auxiliary refrigerant inflow valve 344 are closed, while the generator supply valve 361 and the generator outflow valve 362 are open to enable heat transfer medium flow between the generator 320 and the heat storage tank 360 and drive the cooling process. The cold water outflow valve 381 and the cold water inflow valve 382 are open for nighttime operation, as well as the refrigerant outflow valve 372. The refrigerant storage tank 370 supplies refrigerant accumulated therein during daytime operation to the evaporator 340 via the refrigerant outflow valve 372. This supplements the refrigerant condensate being fed into the evaporator 340 from the condenser 330 during nighttime operation.

The stored heat energy from the heat storage tank 360 meets some of the nighttime load, while the remainder of the nighttime load is accommodated by heat, cold water storage, and refrigerant. This can be facilitated by natural convection or forced by a fan providing airflow over cold water lines.

It is to be understood that the present invention is not limited to the embodiments described above, but encompasses any and all embodiments within the scope of the following claims.

We claim:

1. A solar-powered LiBr-water absorption air conditioning system using hybrid storage, comprising:
    at least one solar collector adapted to heat a heat transfer medium and generate heat energy to drive a cooling process;
    a single generator coupled to the at least one solar collector, the generator having a LiBr-water solution contained therein, the at least one solar collector being configured for circulating the heat transfer medium through the generator to heat the LiBr-water solution and generate water vapor, leaving the LiBr-water solution weak in refrigerant, the single generator being configured in a single-effect absorption system;
    a condenser communicating with the generator downstream thereof for forming a refrigerant condensate from the water vapor;
    an evaporator communicating with the condenser downstream thereof for throttling the refrigerant condensate to cause flash vaporization of the refrigerant condensate, resulting in a cooling effect;
    a load coupled to the evaporator, the load receiving the cooling effect from the evaporator;
    an absorber communicating with the evaporator downstream thereof, the absorber having an input path in communication with the generator to receive the weak-in-refrigerant LiBr-water solution from the generator, the absorber being in communication with the evaporator to receive vaporized refrigerant from the evaporator, whereby the vaporized refrigerant is absorbed by the weak-in-refrigerant LiBr-water solution in order to reconstitute the LiBr-water solution as strong in refrigerant, the absorber having an output path in communication with the generator for feeding the reconstituted LiBr-water solution to the generator; and
    a hybrid storage assembly coupled to components of the solar-powered LiBr-water absorption air conditioning system, the hybrid storage assembly having a plurality of hybrid storage tanks and thermal media disposed in each of the tanks to provide additional cooling assistance during nighttime and uninterrupted operation.

2. The solar-powered LiBr-water absorption air conditioning system according to claim 1, further comprising:
    a first expansion valve disposed in the input path of said absorber, the first expansion valve regulating flow of absorbent from said generator to said absorber; and
    a pump disposed in the output path of said absorber for feeding the reconstituted LiBr-water solution from said absorber to said generator.

3. The solar-powered LiBr-water absorption air conditioning system according to claim 2, further comprising a heat exchanger disposed between said generator and said absorber, the absorbent from said generator and the reconstituted LiBr-water solution from said absorber passing through the heat exchanger in substantially opposite flow paths, the heat exchanger pre-cooling the absorbent prior to discharge into said absorber and pre-heating the reconstituted LiBr-water solution prior to discharge into said generator.

4. The solar-powered LiBr-water absorption air conditioning system according to claim 1, further comprising a second expansion valve coupled to said condenser and to said evaporator for regulating flow of refrigerant from said condenser to said evaporator.

5. The solar-powered LiBr-water absorption air conditioning system according to claim 1, wherein said at least one solar collector comprises a pair of solar collectors.

6. The solar-powered LiBr-water absorption air conditioning system according to claim 5, wherein said pair of solar collectors comprises:
    a first solar collector coupled to said generator, the first solar collector having a first collector outflow valve and a first collector inflow valve coupled to the first solar collector, the first collector outflow valve and the first collector inflow valve selectively regulating flow of the heat transfer medium between the first solar collector and said generator to circulate the heat transfer medium, the first collector outflow valve and the first collector inflow valve being normally open during daytime operation and normally closed during nighttime operation; and
    a second solar collector coupled to said hybrid storage assembly, the second solar collector having a second collector outflow valve and a second collector inflow valve coupled to the second solar collector, the second collector outflow valve and the second collector inflow valve selectively regulating flow of the heat transfer medium between the second solar collector and said hybrid storage assembly to circulate the heat transfer medium, the second collector outflow valve and the second collector inflow valve being normally open during daytime operation and normally closed during nighttime operation.

7. The solar-powered LiBr-water absorption air conditioning system according to claim 6, wherein said plurality of hybrid storage tanks includes a heat storage tank coupled to said second solar collector, the heat storage tank storing heat transfer medium therein, the heat transfer medium being heated by circulating the heat transfer medium from said second solar collector through said second collector outflow valve and said second collector inflow valve, the heat storage tank having a generator supply valve and a generator outlet valve coupled to said generator, the generator supply valve and the generator outlet valve selectively regulating flow of the heat transfer medium between the heat storage tank and said generator to circulate the heat transfer medium, the generator supply valve and the generator outlet valve being normally closed during daytime operation and normally open during nighttime operation to drive the cooling process during nighttime operation.

8. The solar-powered LiBr-water absorption air conditioning system according to claim 7, wherein said plurality of hybrid storage tanks further includes a refrigerant storage tank communicating with said condenser and said evaporator, the refrigerant storage tank having a refrigerant supply valve coupled to said condenser and a refrigerant outflow valve coupled to said evaporator, the refrigerant supply valve being normally open during daytime to accumulate and store refrigerant from said condenser and normally closed during nighttime, the refrigerant outflow valve being normally open during nighttime to feed additional refrigerant to said evaporator during nighttime operation and normally closed during daytime.

9. The solar-powered LiBr-water absorption air conditioning system according to claim 8, wherein said thermal media comprises said heat transfer medium stored in said heat storage tank and said refrigerant stored in said refrigerant storage tank.

10. The solar-powered LiBr-water absorption air conditioning system according to claim 8, wherein said plurality of hybrid storage tanks further includes a cold water storage tank coupled to said evaporator and said load, the cold water storage tank having cold water stored therein, said evaporator having an auxiliary refrigerant outflow valve and an auxiliary refrigerant inflow valve coupled to the cold water storage tank, the auxiliary refrigerant outflow valve and the auxiliary refrigerant inflow valve being normally open during daytime to circulate refrigerant through the cold water storage tank to cool and maintain the cold water at a predetermined temperature and closed during nighttime, the cold water storage tank having a cold water outflow valve and a cold water inflow valve coupled to said load, the cold water outflow valve and the cold water inflow valve being normally open during nighttime to facilitate circulation of the cold water and provide additional cooling during nighttime operation, the cold water outflow valve and the cold water inflow valve being normally closed during daytime.

11. The solar-powered LiBr-water absorption air conditioning system according to claim 10, wherein said thermal media comprises said heat transfer medium stored in said heat storage tank, said refrigerant stored in said refrigerant storage tank, and the cold water stored in said cold water storage tank.

12. The solar-powered LiBr-water absorption air conditioning system according to claim 7, wherein plurality of hybrid storage tanks further includes a cold water storage tank coupled to said evaporator and said load, the cold water storage tank storing cold water therein, said evaporator having an auxiliary refrigerant outflow valve and an auxiliary refrigerant inflow valve coupled to the cold water storage tank, the auxiliary refrigerant outflow valve and the auxiliary refrigerant inflow valve being normally open during daytime to circulate refrigerant through the cold water storage tank to cool and maintain the cold water at a predetermined temperature and closed during nighttime, the cold water storage tank having a cold water outflow valve and a cold water inflow valve coupled to said load, the cold water outflow valve and the cold water inflow valve being normally open during nighttime to facilitate circulation of the cold water and provide additional cooling during nighttime operation, the cold water outflow valve and the cold water inflow valve being normally closed during daytime.

13. The solar-powered LiBr-water absorption air conditioning system according to claim 12, wherein said thermal media comprises said heat transfer medium stored in said heat storage tank and the cold water stored in said cold water storage tank.

14. The solar-powered LiBr-water absorption air conditioning system according to claim 1, wherein said plurality of hybrid storage tanks includes a refrigerant storage tank communicating with said condenser and said evaporator, the refrigerant storage tank having a refrigerant supply valve coupled to said condenser and a refrigerant outflow valve coupled to said evaporator, the refrigerant supply valve being normally open during daytime to accumulate and store refrigerant from said condenser and normally closed during nighttime, the refrigerant outflow valve being normally open during nighttime to feed additional refrigerant to said evaporator during nighttime operation and normally closed during daytime.

15. The solar-powered LiBr-water absorption air conditioning system according to claim 14, wherein said plurality of hybrid storage tanks further includes a cold water storage tank coupled to said evaporator and said load, the cold water storage tank having cold water stored therein, said evaporator having an auxiliary refrigerant outflow valve and an auxiliary refrigerant inflow valve coupled to the cold water storage tank, the auxiliary refrigerant outflow valve and the auxiliary refrigerant inflow valve being normally open during daytime to circulate refrigerant through the cold water storage tank to cool and maintain the cold water at a predetermined temperature and closed during nighttime, the cold water storage tank having a cold water outflow valve and a cold water inflow valve coupled to said load, the cold water outflow valve and the cold water inflow valve being normally open during nighttime to facilitate circulation of the cold water and provide additional cooling during nighttime operation, the cold water outflow valve and the cold water inflow valve being normally closed during daytime.

16. The solar-powered LiBr-water absorption air conditioning system according to claim 15, wherein said thermal media comprises said refrigerant stored in said refrigerant storage tank and said cold water stored in said cold water storage tank.

17. The solar-powered LiBr-water absorption air conditioning system according to claim 15, wherein said evaporator further comprises a refrigerant valve coupled to said evaporator and said absorber, the refrigerant valve being normally open during daytime to selectively regulate flow of refrigerant from said evaporator to said absorber and normally closed during nighttime operation.

18. A method of continuously cooling a load, comprising the steps of:
providing a solar-powered LiBr-water absorption air conditioning system having:
at least one solar collector to heat a heat transfer medium and generate heat energy to drive a cooling process;
a generator coupled to the at least one solar collector, the generator having a LiBr-water solution contained therein, the at least one solar collector circulating the heat transfer medium through the generator to heat the LiBr-water solution, releasing a refrigerant as vapor and leaving an absorbent therein;
a condenser communicating with the generator downstream thereof, the condenser forming a refrigerant condensate from the refrigerant vapor;
an evaporator communicating with the condenser downstream thereof, the evaporator throttling the refrigerant condensate to cause flash vaporization of the refrigerant condensate, resulting in a cooling effect;

a load coupled to the evaporator, the load receiving the cooling effect from the evaporator;

an absorber communicating with the evaporator downstream thereof, the absorber being in communication with the generator to receive absorbent from the generator and refrigerant from the evaporator, the absorber forming the LiBr-water solution to be fed into the generator; and a hybrid storage assembly coupled to components of the solar-powered LiBr-water absorption air conditioning system, the hybrid storage assembly storing thermal media to provide additional cooling assistance during nighttime for continuous daily operation;

heating the LiBr-water solution in the generator to release the refrigerant and leave absorbent therein;

feeding the released refrigerant to the condenser to form the refrigerant condensate;

feeding the absorbent to the absorber;

feeding the refrigerant condensate to the evaporator to induce flash vaporization of the refrigerant and cause the cooling effect, the cooling being discharged into the load;

feeding the refrigerant from the evaporator to the absorber to facilitate absorption of the refrigerant with the absorber and reconstitute the LiBr-water solution;

pumping the LiBr-water solution to the generator; and feeding thermal media to components of the solar-powered LiBr-water absorption air conditioning system to facilitate additional cooling during nighttime for nighttime operation.

19. The method of continuously cooling a load according to claim 18, wherein the step of feeding thermal media comprises the steps of:

providing a heat storage tank coupled to said at least one solar collector, the heat storage tank storing heat transfer medium therein;

feeding the heat transfer medium from the heat storage tank to said generator during nighttime to drive the cooling process during nighttime operation;

providing a refrigerant storage tank coupled to said condenser and said evaporator, the refrigerant storage tank storing refrigerant from said condenser during daytime operation; and feeding refrigerant from said refrigerant storage tank to said evaporator during nighttime operation to supplement required refrigerant for the nighttime operation.

20. The method of continuously cooling a load according to claim 19, wherein the step of feeding thermal media further comprises the steps of:

providing a cold water storage tank coupled to said evaporator and said load, the cold water storage tank storing cold water therein;

circulating refrigerant from said evaporator through the cold water storage tank during daytime to cool and maintain the cold water at a predetermined temperature; and circulating the cold water through said load during nighttime operation to supplement cooling of said load during nighttime operation.

* * * * *